United States Patent [19]
Abe et al.

[11] Patent Number: 4,959,428
[45] Date of Patent: Sep. 25, 1990

[54] EMULSION POLYMERIZATION PROCESS

[75] Inventors: Tadashi Abe; Masahiro Aoki; Takeo Tsukamoto, all of Mie, Japan

[73] Assignee: Mitsubishi Yuka Badische Company, Ltd., Yokkaichi, Japan

[21] Appl. No.: 233,127

[22] Filed: Aug. 17, 1988

[30] Foreign Application Priority Data

Aug. 17, 1987 [JP] Japan .................. 62-203187

[51] Int. Cl.$^5$ .................. C08F 2/22; 526 201; 526 304; 526 315; 526 316
[52] U.S. Cl. .................. 526/201; 526/304; 526/315; 526/316; 525/293; 525/300; 525/309; 525/298
[58] Field of Search ................ 526/201, 304, 315, 316

[56] References Cited

U.S. PATENT DOCUMENTS 3,860,699  1/1975  Kubota et al. .................. 424/47
4,016,332  4/1977  Anderson et al. .................. 525/445
4,031,290  6/1977  Anderson et al. .................. 525/445

FOREIGN PATENT DOCUMENTS 58-104902  6/1983  Japan .

Primary Examiner—Joseph L. Schofer
Assistant Examiner—N. Sarofim
Attorney, Agent, or Firm—Oblon, Spivak, McClelland, Maier & Neustadt

[57] ABSTRACT

A process for emulsion-polymerizing unsaturated monomer(s) is disclosed. When a hydrazine derivative having at least two hydrazine residues per molecule is added to the polymer dispersion obtained by said emulsion polymerization process, a polymer dispersion composition capable of forming a film which is excellent in blocking resistance, adhesiveness to an alkyd resin film, water-resistant adhesiveness to an alkyd resin film and water-resistant anti-whitening can be obtained.

9 Claims, No Drawings

EMULSION POLYMERIZATION PROCESS

FIELD OF THE INVENTION

The present invention relates to a process for emulsion-polymerizing unsaturated monomer(s). When a hydrazine derivative having two or more hydrazine residues per molecule is added to the polymer dispersion as obtained by the emulsion polymerization process of the present invention, a polymer dispersion composition capable of forming a film (coating film or adhesive film) which is excellent in, for example, blocking resistance, chemical resistance and solvent resistance on, for example, wood, metal, paper or slate materials or various molded synthetic resin products, i.e., a potentially crosslinkable polymer dispersion composition can be obtained. In addition, the film formed by the polymer dispersion composition is excellent in water-resistant anti-whitening, water-resistant adhesiveness and rust resistance.

BACKGROUND OF THE INVENTION

The present inventors previously proposed an emulsion polymerization process which comprises: (A) employing as a dispersant a water soluble carbonyl group-containing copolymer comprising (a) 0.5 to 99.5% by weight of a carbonyl group-containing monomer unit having at least one aldehyde or keto group and a polymerizable double bond per molecule; (b) 99.5 to 0.5% by weight of a monomer unit selected from among a monoolefinically unsaturated carboxylic acid having 3 to 5 carbon atoms, an amide of said unsaturated carboxylic acid, an N-alkyl and/or N-alkylol derivative of said unsaturated carboxylic acid amide and a monoolefinically unsaturated sulfonic acid; and (c) 0 to 70% by weight of a monomer unit selected from among an alkyl (meth)acrylate an alkyl moiety of which has 1 to 8 carbon atoms, a vinyl aromatic compound, a vinyl halide, ethylene, acrylonitrile, methacrylonitirle, a saturated carboxylic acid vinyl ester and a 1,3-diene, with the total amount of the monomer units as defined in (a) to (c) being 100% by weight and (B) emulsion-polymerizing, including copolymerizing, unsaturated monomer(s) having polymerizable double bond(s) (cf. Japanese Laid-Open Patent Application No. 104902/83). However, subsequent studies have revealed that a film of a polymer dispersion composition, which is prepared by adding a hydrazine derivative having at least two hydrazine residues per molecule to the polymer dispersion as obtained by the above process, is unsatisfactory in water-resistant anti-whitening, water-resistant adhesiveness and rust resistance, though said film is excellent in blocking resistance, solvent resistance and adhesiveness to an alkyd resin film.

SUMMARY OF THE INVENTION

An object of the present invention is to provide an emulsion polymerization process. When a polymer dispersion obtained by the process of the present invention is blended with a hydrazine derivative having at least two hydrazine residues per molecule, a potentially crosslinkable polymer dispersion composition, which can form a film excellent not only in, for example, solvent resistance and blocking resistance but also in water-resistant anti-whitening, water-resistant adhesiveness and rust resistance, is obtained.

The present inventors have conducted extended studies in order to overcome the above problem and consequently achieve the present invention.

Accordingly, the emulsion polymerization process of the present invention comprises: (A) employing as a dispersant a water soluble copolymer which is obtained by adding an alkali to a carbonyl group-containing copolymer, which comprises (a) 0.5 to 27% by weight of a carbonyl group-containing monomer unit having at least one aldehyde or keto group and a polymerizable double bond per molecule; (b) 2 to 28.5% by weight of a monoolefinically unsaturated carboxylic acid unit having 3 to 5 carbon atoms; (c) 71 to 97% by weight of a monomer unit selected from among an alkyl acrylate an alkyl moiety of which has 1 to 8 carbon atoms, an alkyl methacrylate an llkyl moiety of which has 1 to 8 carbon atoms, a vinyl aromatic compound, a vinyl halide, acrylonitrile, methacrylonitrile and a saturated carboxylic acid vinyl ester; and (d) 0 to 10% by weight of a monomer unit other than those as defined in (a) to (c), with the total amount of the monomer units as defined in (a) to (d) being 100% by weight to thereby water-solubilize the same and (B) emulsion-polymerizing, including copolymerizing, unsaturated monomer(s) having polymerizable double bond(s).

DETAILED DESCRIPTION OF THE INVENTION

Examples of the monomer forming the monomer unit (a) of the carbonyl group-containing copolymer to be used in the preparation of the dispersant in the emulsion polymerization process of the present invention include acrolein, diacetone acrylamide, formylstyrol, a vinyl alkyl ketone having 4 to 7 carbon atoms such as vinyl methyl ketone, vinyl ethyl ketone or vinyl butyl ketone, an acryloxyalkylpropenal or methacryloxyalkylpropenal of the followihg general formula:

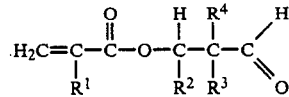

wherein $R^1$ represents a hydrogen atom or a $CH^3$ group; $R^2$ represents a hydrogen atom or an alkyl group having 1 to 3 carbon atoms; $R^3$ represents an alkyl group having 1 to 3 carbon atoms; and $R^4$ represents an alkyl group having 1 to 4 carbon atoms, diacetone acrylate, acetonitrile acrylate diacetone methacrylate, 2-hydroxypropyl acrylate acetyl acetate and butanediol-1,4-acrylate acetyl acetate., Among these monomers, diacetone acrylamide, acrolein and vinyl methyl ketone are particularly preferable. The copolymer may comprise two or more of these monomer units (a).

The carbonyl group-containing copolymer may comprise 0.5 to 27% by weight, preferably 5 to 25% by weight, of the monomer unit (a) based on the total amount of the mono-mer units as defined in (a) to (d). When the content of said monomer unit (a) is lower than the above range, the content of the aldehyde or keto group in the copolymer becomes too small, which brings about insufficient improvement of the film properties such as blocking resistance of the polymer dispersion composition obtained by adding a hydrazine derivative to the polymer dispersion obtained by the emulsion polymerization. On the other hand, when the content of the monomer unit (a) exceeds the above range, the relatively lowered content of the monomer unit (b) causes insufficient water-solubilization of the obtained copolymer at the addition of an alkali thereto. Thus the emulsion polymerization system of the present invention becomes unstable in this case.

The monomer forming the monomer unit (b) in said copolymer is a monoolefinically unsaturated carboxylic acid having 3 to 5 carbon atoms. Said carboxylic acid may be either a monocarboxylic acid or a dicarboxylic acid. Preferable examples of the monomer forming said monomer unit (b) include acrylic acid, methacrylic acid, itaconic acid and maleic acid. The copolymer may comprise two or more of these monomer units (b).

The copolymer may comprise 2 to 28.5% by weight, preferably 5 to 15% by weight, of the monomer unit (b) based on the total amount of the monomer units as defined in (a) to (d). When the content of said monomer unit (b) is lower than the above range, the water-solubilization of the copolymer at the addition of an alkali thereto becomes insufficient, which makes the resulting polymer system at the emulsion polymerization unstable. On the other hand, when the content of the monomer unit (b) exceeds the above range, the relatively lowered content of the monomer unit (a) brings about insufficient improvement of the film properties of the polymer dispersion composition prepared by adding a hydrazine derivative to the polymer dispersion obtained through the emulsion polymerization. Further the resulting copolymer becomes excessively hydrophilic at the addition of an alkali thereto in this case, which lowers the water resistance of the film formed by the polyme dispersion composition obtained by adding a hydrazine derivative thereto.

Examples of the monomer forming the monomer unit (c) in said copolymer include an alkyl acrylate or alkyl methacrylate an alkyl moiety of which has 1 to 8 carbon atoms such as methyl acrylate, methyl methacrylate, ethyl acrylate, ethyl methacrylate, isopropyl acrylate, isopropyl methacrylate, n-propyl acrylate, n-propyl methacrylate, n-butyl acrylate, n-butyl methacrylate, isobutyl acrylate, isobutyl methacrylate, t-butyl acrylate or tbutyl methacrylate, a vinyl aromatic compound such as styrene, a vinyl halide such as vinyl chloride, vinyl bromide or vinylidene chloride, acrylonitrile, methacrylonitrile and a saturated carboxylic acid vinyl ester such as vinyl acetate or vinyl propionate. Among these monomers, an alkyl acrylate or alkyl methacrylate an alkyl moiety of which has 1 to 8 carbon atoms and vinyl acetate are particularly preferable. The copolymer may comprise two or more of these monomer units (c).

The copolymer may comprise 71 to 97% by weight, preferably 75 to 90% by weight, of the monomer unit (c) based on the total amount of the monomer units as defined in (a) to (d). When the content of the monomer unit (c) is less than the above range, a film of a polymer dispersion composition obtained by adding a hydrazine derivative thereto has poor water-resistant adhesiveness, water-resistant anti-whitening and rust resistance. Although the reason therefor has not been sufficiently clarified yet, it is assumed that a lower content of the monomer unit (c) in the copolymer would lower the surface tension reducability of the product obtained by adding an alkali to the copolymer, which might enlarge the particle size of the polymer dispersion obtained through the emulsion polymerization with the use of said product as a dispersant. On the other hand, when the content of the monomer unit (c) exceeds the above range, the relatively lowered contents of the monomer units (a) and (b) result in insufficient improvement of the film properties such as blocking resistance of the polymer dispersion composition obtained by adding a hydrazine derivative to the polymer dispersion or in insufficient water-solubilization of the copolymer at the addition of an alkali thereto, which would lower the stability of the emulsion polymerization system.

The copolymer further comprises the monomer unit (d) other than those as defined in (a) to (c). The copolymer may comprise 0 to 10% by weight of the monomer unit (d) based on the total amount of the monomer units as defined in (a) to (d). That is to say, the monomer unit (d) is not an essential component. Examples of the monomer forming the monomer unit (d) in said copolymer include a monoolefinically unsaturated carboxylic acid amide such as acrylamide, methacrylamide or itaconamide, an N-alkyl and/or N-alkylol derivative of a monoolefinically unsaturated carboxylic acid amide such as N-methyl acrylamide, N-isobutyl acrylamide, N-methylol acrylamide, N-methylol methacrylamide or N-ethoxymethyl acrylamide and a monoolefinically unsaturated sulfonic acid such as vinylsulfonic acid and methylacrylamide propansulfonic acid. The copolymer may comprise two or more of these monomer units (d).

When an alkali is added to the carbonyl group-containing copolymer as described above in detail, the carboxyl groups contained in said copolymer are partially or completely neutralized and thus water-solubilized to thereby give a water soluble copolymer. In the emulsion polymerization process of the present invention, said water-solubilized copolymer is employed as a dispersant. Examples of the alkali to be added in order to water-solubilize said carbonyl group-containing copolymer include not only inorganic water soluble alkalis such as sodium hydroxide or potassium hydroxide and inorganic salts which become alkaline when dissolved in water such as sodium hydrogen carbonate or sodium pyrophosphate but also aqueous ammonia and organic amines. It is not always necessary to add the alkali to the carbonyl group-containing copolymer after the formation of said copolymer. Thus it is sometimes possible to add the alkali to a monomer, which is to be formulated into the monomer unit (b), to thereby neutralize said monomer and then copolymerize the same with other ones.

The emulsion polymerization process of the present invention comprises emulsion-polymerizing unsaturated monomer(s) having polymerizable double bond(s) with the use of the carbonyl group-containing copolymer, which has been water-solubilized by adding an alkali thereto, as a dispersant.

Various monomers may be used as the unsaturated monomer to be emulsion-polymerized depending on, for example, the purpose of the obtained polymer dispersion. Examples thereof include an aromatic vinyl monomer such as styrene, α-methylstyrene or chlorostyrene; an unsaturated carboxylic acid such as acrylic acid or methacrylic acid; an unsaturated carboxylic acid amide such as acrylamide or methacrylamide; an acrylate such as methyl acrylate, ethyl acrylate or butyl acrylate; a methacrylate such as methyl methacrylate or ethyl methacrylate; a vinyl halide such as vinyl chloride, vinyl bromide or vinylidene chloride; a vinyl ester such as vinyl acetate or vinyl propionate; a conjugated diene such as butadiene or isoprene; and ethylene. These monomers may be appropriately selected depending on, for example, the use of the obtained polymer dispersion. In general, two or more monomers are copolymerized together.

The emulsion polymerization of the present invention may be carried out in a conventional manner except that the product obtained by adding an alkali to the carbonyl group-containing copolymer as specified above is used as a dispersant. As a matter of course, a polymerization initiator is further employed. In addition, an emulsifier and a dispersant other than the one as specified above may be further employed.

Examples of the initiator include a persulfate such as potassium persulfate or ammonium persulfate; a peroxide such as hydrogen peroxide, benzoyl peroxide, cumene hydroperoxide or t-butyl hydroperoxide; and azobisisobutyronitrile. It is particularly preferable to use a water soluble initiator or a redox initiator wherein a reductant is combined with one of the abovementioned initiators.

Examples of the emulsifier to be used together include an anionic surfactant such as a higher alcohol sulfate, an alkyl benzensulfonate, a polyoxyethylene alkyl sulfate and a polyoxyethylene alkyl phenol ether sulfate and a nonionic surfactant such as a polyoxyethylene alkyl ether, a polyoxyethylene alkyl phenol ether, ethylene oxide/propylene oxide block copolymer and a sorbitan derivative.

In the emulsion polymerization of the present invention, a dispersant other than the one as specified above, for example, polyvinyl alcohol or hydroxyethyl cellulose may be sometimes used together. However, it is preferable to minimize the amount of any dispersant other than the specified one to thereby avoid to lower the excellent properties of the resulting polymer dispersion.

The emulsion polymerization is to be generally effected at a temperature of 40 to 90° C., preferably 60 to 90° C., although it is not restricted thereby.

The dispersibility of the carbonyl group-containing copolymer, which has been water-solubilized by adding an alkali thereto, to be used as a dispersant in the emulsion polymerization of the present invention reduces at an acidic region. Thus it is required to take special care in such a case. For example, when an unsaturated carboxylic acid monomer such as acrylic acid or methacrylic acid is to be emulsion-polymerized according to the process of the present invention or a persulfate is to be used as an initiator, the polymerization system is liable to be acidic. In these cases, it is preferable to stabilize the system by adding an alkali thereto.

The polymer dispersion as obtained by the emulsion polymerization of the present invention contains the water soluble carbonyl group-containing copolymer employed as the dispersant in the emulsion polymerization. When a hydrazine derivative having at least two hydrazine residues per molecule is added to the polymer dispersion to thereby give a polymer dispersion composition, the aldehyde or keto group in the dispersant copolymer would crosslink with the hydrazine residues in the hydrazine derivative. Thus the dispersant becomes insoluble in water. Therefore a film of the resulting polymer dispersion composition is excellent in, for example, chemical resistance, blocking resistance, solvent resistance. and adhesiveness to an alkyd film. In addition, the polymer dispersion composition, which is obtained by adding a hydrazine derivative to the polymer dispersion obtained by the emulsion polymerization of the present invention and comprising fine particles, has excellent film-forming properties and gives a film having significantly improved water resistance, in particular, water-resistant anti-whitening, water-resistant adhesiveness and rust resistance. Therefore the polymer dispersion obtained by the emussion polymerization of the present invention is highly useful as, for example, a paint, a maintenance material for coatings, a binder for nonwoven fabric or an adhesive for paper or fabric.

The hydrazine derivative to be added to the polymer dispersion obtained by the emulsion polymerization of the present invention has at least two hydrazine residues per molecule. Examples thereof include a dicarboxylic acid dihydrazide having 2 to 10, in particular 4 to 6, carbon atoms such as oxalic dihydrazide, malonic dihydrazide, succinic dihydrazide, glutalic dihydrazide, adipic dihydrazide, sebacic dihydrazide, maleic dihydrazide, fumaric dihydrazide or itaconic dihydrazide; and an aliphatic water-soluble dihydrazine having 2 to 4 carbon atoms such as ethylene-1,2dihydrazine, propylene-1,3-dihydrazine and butylene-1,4dihydrazine. Further a polymer represented by the general formula:

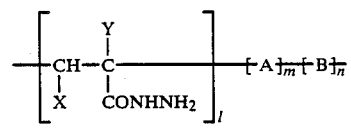

wherein X represents a hydrogen atom or a carboxyl group; Y represents a hydrogen atom or a methyl group; A represents an acrylamide unit, a methacrylamide unit, an acrylate unit, a methacrylate unit or an maleic anhydride unit; B represents a monomer unit copolymerizable with acrylamide, methacrylamide, acrylate, methacrylate or maleic anhydride; and m and n represent numbers satisfying the following relations:

$$2\% \text{ by mol} \leq l \leq 100\% \text{ mol}$$
$$0\% \text{ by mol} \leq (m + n) \leq 98\% \text{ by mol}$$
$$(l + m + n) = 100\% \text{ by mol}$$

may be used as the hydrazine derivative. Such a polymer is described in detail in, for example, Japanese Laid-Open Patent Application No. 6535/80.

To further illustrate the present invention, the following Dispersant-Preparation Examples, Examples, Comparative Examples and Test Examples will be given, wherein every part and % are by weight unless otherwise noted.

DISPERSANT-PREPARATION EXAMPLE 1

The air in a reactor provided with a thermostat, an anchor-type stirrer, a reflux condenser, a supply tank, a thermometer and a nitrogen inlet was replaced with nitrogen gas. Then 200 parts of butyl cellosolve was introduced thereto.

Separately feed materials I and II of the following compositions were prepared.

|  | (part) |
|---|---|
| Feed material I | |
| Diacetone acrylamide | 30 |
| Acrylic acid | 9 |
| Methyl acrylate | 81 |
| Butyl acrylate | 30 |
| Feed material II | |
| Butyl cellosolve | 100 |

-continued

| | (part) |
|---|---|
| Azobisisobutylonitrile | 6 |

Subsequently the content of the reactor was heated to 80° C. and the feed materials I and II were homogeneously and continuously added thereto within three hours under stirring to thereby react these materials with each other. After the completion of the addition, the resulting mixture was maintained at 80° C. for additional one hour to thereby complete the polymerization. The obtained polymerized product was cooled to room temperature to thereby give a solution of a carbonyl group-containing copolymer in butyl cellosolve.

Table 1 shows the composition, namely, the content of each monomer unit of the carbonyl group-containing copolymer thus obtained.

The organic solvent, i.e., butyl cellosolve was almost completely removed from the obtained solution of the carbonyl group-containing copolymer through distillation on a rotary evaporator. Then the residue was neutralized with an aqueous solution of sodium hydroxide and then diluted with water to thereby give an aqueous solution of a dispersant of a concentration of 20%.

DISPERSANT-PREPARATION EXAMPLES 2 AND 3

The polymerization procedure of the Dispersant-Preparation Example 1 was repeated except varying the monomer and the amount thereof to thereby give solutions of carbonyl group-containing copolymers each having the composition as shown in Table 1. Then each copolymer solution was treated in the same manner as the one described in Dispersant Preparation Example 1 to thereby give an aqueous solution of a dispersant. Detailed results are shown in Table 1.

DISPERSANT-PREPARATION EXAMPLE 4

The air in the same reactor as the one used in Dispersant-Preparation Example 1 was replaced with nitrogen gas and 200 parts of water and one part of sodium lauryl sulfate were introduced thereto.

Separately feed materials I and II of the following compositions were prepared.

| | (part) |
|---|---|
| Feed material I | |
| Water | 90 |
| Sodium lauryl sulfate | 0.5 |
| Sodium metabisulfite | 0.5 |
| Diacetone acrylamide | 27 |
| Methacrylic acid | 9 |
| Methyl methacrylate | 39 |
| Vinyl acetate | 75 |
| Feed material II | |
| Water | 50 |
| Sodium persulfate | 2 |

Then the content of the reactor was heated to 85° C. and the feed materials I and II were homogeneously and continuously added thereto under stirring within three hours. After the completion of the addition, the content of the reactor was heated to 90° C. and then maintained at this temperature for 1.5 hours to thereby complete the polymerization. After the completion of the polymerization, the reaction mixture was cooled to room temperature to thereby give an aqueous dispersion of a carbonyl group-containing copolymer.

Table 1 shows the composition of the carbonyl group-containing copolymer.

The aqueous dispersion of the carbonyl group-containing copolymer thus obtained was neutralized with an aqueous solution of sodium hydroxide to thereby give an aqueous solution of a dispersant which is shown in detail in Table 1.

DISPERSANT-PREPARATION EXAMPLE 5

The procedure of the Dispersant-Preparation Example 1 was repeated except substituting the monomer with another one to thereby give a copolymer solution of the composition as shown in Table 1. Then the copolymer solution was treated in the same manner as the one described in Dispersant Preparation Example 1 to thereby give an aqueous solution of a dispersant which is shown in detail in Table 1.

This aqueous dispersant solution was prepared as a comparative dispersant to be used in Comparative Example 1.

DISPERSANT-PREPARATION EXAMPLE 6

The air in the same reactor as the one used in the Dispersant-Preparation Example 1 was replaced with nitrogen gas and then 200 parts of water was introduced thereto.

Separately feed materials I and II of the following compositions were prepared.

| | (part) |
|---|---|
| Feed material I | |
| Water | 100 |
| Acrylic acid | 80 |
| Diacetone acrylamide | 20 |
| Feed material II | |
| Water | 100 |
| Potassium persulfate | 2.5 |

Then the content of the reactor was heated to 90° C. and the feed materials I and II were homogeneously and continuously added thereto within three hours under stirring. After the completion of the addition, the reaction mixture was maintained at 90° C. for additional one hour to thereby complete the polymerization.

The polymerized product thus obtained was cooled and diluted with water to thereby give an aqueous solution of a dispersant which is shown in detail in Table 1. This aqueous dispersant solution was prepared as a comparative dispersant to be used in Comparative Example 2.

TABLE 1

| | Dispersant-Preparation Example | | | | | |
|---|---|---|---|---|---|---|
| | 1 | 2 | 3 | 4 | 5 | 6 |
| Polymerization solvent or dispersion medium | Butyl cellosolve | Butyl cellosolve | Isopropyl alcohol | Water | Butyl cellosolve | Water |
| Copolymer composition (% by weight) | | | | | | |

TABLE 1-continued

| | Dispersant-Preparation Example | | | | | |
|---|---|---|---|---|---|---|
| | 1 | 2 | 3 | 4 | 5 | 6 |
| Diacetone acrylamide | 20 | 15 | — | 18 | 50 | 20 |
| Acrolein | — | — | 15 | — | — | — |
| Acrylic acid | 6 | — | 5 | — | — | 80 |
| Methacrylic acid | — | 10 | — | 6 | 10 | — |
| Methyl acrylate | 54 | — | 40 | — | — | — |
| Methyl methacrylate | — | 55 | — | 26 | 20 | — |
| Butyl acrylate | 20 | 20 | 10 | — | 20 | — |
| Vinyl acetate | — | — | 30 | 50 | — | — |
| Dispersant | | | | | | |
| neutralizing alkali | NaOH | $NH_3$ | NaOH | NaOH | NaOH | none |
| conc. of aq. soln. | 20% | 20% | 20% | 20% | 20% | 20% |
| Note | Ex. | Ex. | Ex. | Ex. | C.Ex. | C.Ex. |

EXAMPLE 1

300 parts of water and the aqueous dispersant solution (concentration: 20%) as prepared in Dispersant-Preparation Example 1 were introduced into a reactor provided with a thermostat, an anchor-type stirrer, a reflux condenser, a supply tank, a thermometer and a nitrogen inlet.

Separately feed materials I and II of the following compositions were prepared.

| | (part) |
|---|---|
| Feed material I | |
| Methyl methacrylate | 220 |
| 2-Ethylhexyl acrylate | 170 |
| Acrylamide | 10 |
| Feed material II | |
| Water | 120 |
| Sodium persulfate | 2.5 |
| Sodium hydroxide | 0.8 |

Then the air in the reactor was replaced with nitrogen gas. A 1/10 portion of the feed material I was introduced into the reactor and heated to 90° C. Further a 1/10 portion of the feed material II was introduced thereto. Then the residual feed materials I and II were added to the reactor together by portions within 3 to 3.5 hours. After the completion of the addition, the reaction mixture was maintained at 90° C. for additional 1.5 hours. Then the reactor was cooled to room temperature and aqueous ammonia was introduced thereto to thereby adjust the pH value of the reaction product to 7 to 8. Thus an aqueous dispersion of a copolymer was obtained.

Table 2 shows the monomers, amounts thereof, the aqueous dispersant solution and the amount thereof as well as the solid content and average particle size of the polymer dispersion thus obtained.

EXAMPLES 2 TO 4 AND COMPARATIVE EXAMPLES 1 TO 3

The procedure of Example 1 was repeated except varying the employed dispersant and monomers as shown in Table 2 to thereby effect emulsion polymerization.

Table 2 shows the solid content and average particle size of each aqueous polymer dispersion thus obtained.

TABLE 2

| | Example | | | | Comparative Example | | |
|---|---|---|---|---|---|---|---|
| | 1 | 2 | 3 | 4 | 1 | 2 | 3 |
| Emulsion polymerization conditions | | | | | | | |
| Dispersant (part by wt.) | Ex.1 (20) | Ex.2 (20) | Ex.3 (30) | Ex.4 (30) | Ex.5 (20) | Ex.6 (20) | *1 |
| Monomer (part by wt.) | | | | | | | |
| Styrene | — | 110 | 190 | — | — | 110 | — |
| Methyl methacrylate | 220 | 100 | — | 210 | 220 | 100 | 220 |
| Butyl acrylate | — | 170 | 200 | 180 | — | 170 | — |
| 2-Ethylhexyl acrylate | 170 | — | — | — | 170 | — | 10 |
| Acrylamide | 10 | — | 10 | 4 | 10 | — | 10 |
| Diacetone acrylamide | — | 16 | — | 6 | — | 16 | — |
| Acrylic acid | — | 4 | — | — | — | 4 | — |
| Polymer dispersion product | | | | | | | |
| solid content (% by wt.) | 50 | 48 | 48 | 45 | 50 | 50 | 50 |
| average particle size ($\mu$)*2 | 0.1 | 0.12 | 0.15 | 0.12 | 0.25 | 0.3 | 0.1 |

Note
*1: 25 parts by weight of a mixture of a 35% by weight aqueous solution of sodium salt of semisulfate of p-nonyl phenol 20 mole ethylene oxide adduct and a 20% aqueous solution of p-nonyl phenol 25 mole ethylene oxide adduct at a weight ratio of 15/10 was employed.
*2: Determined under an electron microscope.

TEST EXAMPLES 1 TO 7

To 100 parts of each aqueous polymer dispersion as prepared in Examples 1 to 4 and Comparative Examples 1 to 3, a hydrazine derivative as specified in Table 3 was added each in an amount as defined in Table 3. After stirring, various polymer dispersion compositions (paint compositions) were obtained.

The film forming properties of each paint composition thus obtained were evaluated in the following manner. Table 3 shows the results.

(1) Blocking resistance

Each paint composition was applied onto a glass plate to give a film of 50 $\mu$ in thickness and dried at 20° C. for one week to thereby give a sample. A sheet of gauze was placed on the film of the sample and further a load of 500 g was applied thereto. After allowing to stand at 50° C. for 24 hours, the stickiness of the film was evaluated according to the following criterion:
A: nonsticky
B: slightly sticky
C: sticky
D: significantly sticky (2) Adhesiveness and water-resistant adhesiveness to alkyd resin film Each paint composition was applied onto an alkyd resin film to thereby form a film of 50 μ in thickness and dried at 20° C. for one week to thereby give a sample. The sample and another one obtained by immersing said sample in water at 20° C. for 24 hours were subjected to a peeling test with the use of an adhesive cellophane tape (Callotape ®: mfd. by Nichiban Co., Ltd.). The results were evaluated according to the following criterion:
A: no peeling
B: partially peeling
C: completely peeling
D: lifting of the film at the immersion in water (3) Water-resistant anti-whitening The water-resistant anti-whitening of each paint composition was evaluated by observing the film with the naked eye after immersing the same sample as the one used in (1) in water at 20° C. for 24 hours.

(4) Rust resistance

Each paint composition was applied onto a soft steel plate to give a film of 50 μ in thickness and dried at 20° C. for one week to thereby give a sample. This sample was immersed in a 3% solution of common salt for 24 hours and then allowed to stand in the atmosphere for one day. Then the formation of rust was observed with the naked eye and evaluated according to the following criterion:
A: no rusting
B: slightly rusting
C: rusting
D: significantly rusting reactor provided with a thermostat, an anchor-type stirrer, a reflux condenser, a thermometer and a nitrogen inlet. The resulting mixture was allowed to react at 70° C. for approximately ten hours under stirring. Then the reaction product was slowly added to 10 l of methanol under stirring. The precipitate thus formed was purified through reprecipitation to thereby give a polyacrylic acid hydrazide polymer. As the result of iodometric titration, it was found that this polymer contained 75% by mol of hydrazide groups.

When blended with a hydrazine derivative having at least two hydrazine residues per molecule, the polymer dispersion obtained by the emulsion polymerization process of the present invention can give a film excellent in blocking resistance, adhesiveness to an alkyd resin film, water-resistant adhesiveness to an alkyd resin film and water-resistant anti-whitening.

While the invention has been described in detail and with reference to specific embodiments thereof, it will be apparent to one skilled in the art that various changes and modifications can be made therein without departing from the spirit and scope thereof.

What is claimed is:

1. An emulsion polymerization process comprising: (A) employing as a dispersant a water soluble copolymer obtained by adding an alkali to a carbonyl group-containing copolymer, which comprises (a) 0.5 to 27 by weight of a carbonyl group-containing monomer unit having at least one aldehyde or keto group and a polymerizable double bond per molecule; (b) 2 to 28.5% by weight of a monoolefinically unsaturated carboxylic acid unit having 3 to 5 carbon atoms; (c) 71 to 97% by weight of a monomer unit selected from the group consisting of an alkyl acrylate an alkyl moiety of which has 1 to 8 carbon atoms, an alkyl methacrylate an alkyl moiety of which has 1 to 8 carbon atoms, a vinyl aromatic compound, a vinyl halide, acrylonitrile, methacrylonitrile and a saturated carboxylic acid vinyl ester; and (d)-0 to 10% by weight of a monomer unit other than those as defined in (a) to (c), with the total amount of the monomer units as defined in (a) to (d) being 100% by weight to thereby water-solubilize the same and (B) emulsion-polymerizing, including copolymerizing, unsaturated monomer(s) having polymerizable double bond(s).

2. The emulsion polymerization process as claimed in claim 1, wherein a monomer forming said monomer unit

TABLE 3

| | Test Example | | | | | | |
|---|---|---|---|---|---|---|---|
| | 1 | 2 | 3 | 4 | 5 | 6 | 7 |
| Paint composition | | | | | | | |
| Aqueous dispersion (part) | Ex.1 (100) | Ex.2 (100) | Ex.3 (100) | Ex.4 (100) | C.Ex.1 (100) | C.Ex.2 (100) | C.Ex.3 (100) |
| Hydrazine derivative (part) | ADH* (1) | PAAH** (2) | ADH* (1) | ADH* (1) | ADH* (1) | PAAH** (2) | none (—) |
| Film properties | | | | | | | |
| Blocking resistance | A | A | A | A | A | A | C |
| Water-resistant anti-whitening | high | high | high | high | low | low | medium |
| Adhesiveness to alkyd resin film | A | A | A | A | A | B | B |
| Water-resistant adhesiveness to alkyd resin film | A | B | A | A | C | C | D |
| Rust resistance | A | A | B | A | B | B | C |

Note
*adipic dihydrazide
**polyacrylic acid hydrazide polymer

The polyacrylic acid hydrazide polymer as shown in Table 3 was prepared by the following method. 300 g of a 20% aqueous solution of polyacrylamide (molecular weight: 30,000 to 40,000) and 600 g of a 80% aqueous solution of hydrazine hydrate were introduced into a as defined in (a) is selected from the group consisting of diacetone acrylamide, acrolein and vinyl methyl ketone.

3. The emulsion polymerization process as claimed in claim 1, wherein said carbonyl group-containing copolymer comprises 5 to 25% by weight of the monomer units as defined in (a).

4. The emulsion polymerization process as claimed in claim 1, wherein a monomer forming said monomer unit as defined in (b) is selected from the group consisting of acrylic acid, methacrylic acid, itaconic acid and maleic acid.

5. The emulsion polymerization process as claimed in claim 1, wherein said carbonyl group-containing copolymer comprises 5 to 15% by weight of the monomer units as defined in (b).

6. The emulsion polymerization process as claimed in claim 1, wherein a monomer forming said monomer unit as defined in (c) is selected from the group consisting of an alkyl acrylate an alkyl moiety of which has 1 to 8 carbon atoms, an alkyl methacrylate an alkyl moiety of which has 1 to 8 carbon atoms and vinyl acetate.

7. The emulsion polymerization process as claimed in claim 1, wherein said carbonyl group-containing copolymer comprises 75 to 90% by weight of the monomer units as defined in (c).

8. The emulsin polymerization process as claimed in claim 1, wherein said alkali is selected from the group consisting of inorganic water soluble alkalis, inorganic salts which become alkaline when dissolved in water, aqueous ammonia and organic amines.

9. The emulsion polymerization process as claimed in claim 1, wherein said unsaturated monomer having a polymerizable double bond to be emulsion-polymerized is selected from the group consisting of an aromatic vinyl monomer, an unsaturated carboxylic acid, an unsaturated carboxylic acid amide, an acrylate, a methacrylate, a vinyl halide, a vinyl ester, a conjugated diene and ethylene.

* * * * *